United States Patent
Byun et al.

(10) Patent No.: US 7,911,451 B2
(45) Date of Patent: *Mar. 22, 2011

(54) METHOD FOR SEARCHING MENU IN MOBILE COMMUNICATION TERMINAL

(75) Inventors: Yu Chan Byun, Kyungki-Do (KR); Chan Yong Park, Seoul (KR); Jun Hyoung Koo, Seoul (KR); Jin Soo Lee, Kyungki-Do (KR); Yu Sung Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 260 days.

This patent is subject to a terminal disclaimer.

(21) Appl. No.: 11/646,529

(22) Filed: Dec. 28, 2006

(65) Prior Publication Data

US 2007/0113203 A1 May 17, 2007

Related U.S. Application Data

(63) Continuation of application No. 09/789,749, filed on Feb. 22, 2001.

(30) Foreign Application Priority Data

Feb. 22, 2000 (KR) .................... 2000/8609

(51) Int. Cl.
*G06F 3/02* (2006.01)
*G06F 3/00* (2006.01)
*G09G 5/00* (2006.01)
*H04M 1/00* (2006.01)

(52) U.S. Cl. .............. 345/169; 455/566; 715/700

(58) Field of Classification Search ......... 345/156, 345/169; 455/550.1, 566; 715/700, 713, 715/717, 764, 781, 784, 786
See application file for complete search history.

(56) References Cited

U.S. PATENT DOCUMENTS

| | | | |
|---|---|---|---|
| 5,721,847 A * | 2/1998 | Johnson | 715/786 |
| 5,761,610 A | 6/1998 | Sorensen et al. | |
| 5,841,849 A | 11/1998 | Macor | |
| 6,011,546 A | 1/2000 | Bertram | 715/700 |
| 6,011,549 A | 1/2000 | Shoji et al. | 345/684 |
| 6,029,065 A | 2/2000 | Shah | |
| 6,125,287 A | 9/2000 | Cushman et al. | |
| 6,208,879 B1 * | 3/2001 | Iwata et al. | 455/566 |
| 6,415,164 B1 * | 7/2002 | Blanchard et al. | 455/566 |
| 6,429,773 B1 | 8/2002 | Schuyler | |
| 6,456,841 B1 | 9/2002 | Tomimori | |
| 6,549,789 B1 | 4/2003 | Kfoury | |

FOREIGN PATENT DOCUMENTS

| | | |
|---|---|---|
| CN | 97114761.2 | 7/1997 |
| CN | 99105581.0 | 3/1999 |
| JP | 09-198221 | 7/1997 |
| JP | 10-214172 | 8/1998 |
| JP | 11-184598 | 7/1999 |

OTHER PUBLICATIONS

Office Action dated Dec. 24, 2009 for U.S. Appl. No. 09/789,749.
Office Action dated Dec. 29, 2009 for U.S. Appl. No. 11/646,265.
Office Action dated Nov. 30, 2009 for U.S. Appl. No. 11/646,548.

* cited by examiner

*Primary Examiner* — Srilakshmi K Kumar
(74) *Attorney, Agent, or Firm* — KED & Associates, LLP

(57) ABSTRACT

The present invention relates to a method for searching a menu in a mobile communication terminal, wherein a plurality of main menus and sub menus of each main menu are simultaneously searched on a single menu screen using various navigational keys.

28 Claims, 5 Drawing Sheets ns # US 7,911,451 B2

METHOD FOR SEARCHING MENU IN MOBILE COMMUNICATION TERMINAL

This application is a continuation of U.S. patent application Ser. No. 09/789,749, filed Feb. 22, 2001, which claims priority from Korean Patent Application No. 8609/2000, filed Feb. 22, 2000, the subject matters of which are incorporated herein by reference.

BACKGROUND OF THE INVENTION

1. Field of the Invention

The present invention relates to a mobile communication terminal, and more particularly, to a method for searching a menu in a mobile communication terminal.

2. Background of the Related Art

In recent years, along with the rapid progress in information communication technology, the information and communication environment is being dramatically changed. In particular, the number of mobile communication users is rapidly increasing. Accordingly, the demand for personal portable communication apparatuses, e.g., mobile communication terminals, is increasing at an explosive rate.

The mobile communication terminal provides a variety of text/character services. For example, a user can send/receive messages, store data, receive weather forecasts and securities market information. The terminal can also be used for telephone calls, and recently provides internet services using mobile communication.

FIG. 1 is a schematic diagram of an external structure of a related art mobile communication terminal. As illustrated in FIG. 1, the related art mobile communication terminal (hereinafter "terminal") includes a terminal main body 101, a liquid crystal display (LCD) 102, and a key input unit 103. In addition, the key input unit 103 can include various function keys, for example, a numeric key, call key, end/power key, search key, store key, delete key, and menu key.

FIG. 2 is a schematic diagram of an internal structure of a mobile communication terminal as illustrated in FIG. 1. Referring to FIG. 2, the key input unit 103 is used as a user data input device. It typically includes at least 22 key buttons. The mobile station modem (MSM) 104 has a microprocessor unit (MPU) for controlling all devices, and stores an event signal inputted through the key input unit 103 in a flash memory 105 or converts data read out from the flash memory 105 into a CD signal to output the same to a LCD 102.

The flash memory 105 stores initial data to be displayed on the LCD 102, and a cache memory 106 reads the stored data in the flash memory 105 and edits final data to be outputted to the LCD 102. The LCD 102 receives the data stored in the cache memory 106 through the MSM 104, and displays the same so that a user can recognize it.

A method for searching a menu in the thusly constructed related art mobile communication terminal will next be described.

When a user presses the menu key in the key input unit 103, the LCD 102 displays a main menu, such as "volume control," "telephone bell selection," "talk time," and the like, as illustrated in FIG. 3A. In this state, when the user selects, for example, the "telephone bell selection" menu, the LCD 102 displays sub-menus, such as "telephone bell type," "basic melody," "OTA melody," as illustrated in FIG. 3B. Subsequently, if the user selects the "telephone bell type" menu from the sub-menus, items such as the "telephone bell," "vibration," "vibration+telephone bell," and the like are sequentially searched, as illustrated in FIG. 3C.

A desired function can thus be selected.

Meanwhile, if the user knows the number corresponding to each menu item, he or she can search a desired menu item. However, there is typically a limit in the user's ability to memorize the numbers of menu items.

In addition, if the user realizes that the desired item is not included in the selected main menu while sequentially searching the main menus and the sub menus, the user must press the "end" key, and thereafter release the search step in the order of a lowest level sub menu, an upper level sub menu, and finally the main menu, and try to access the desired item again. Alternatively, the user can perform the search step from the beginning by pressing the "end" key to release the menu search, and then pressing the menu key again.

The related art mobile terminal, however, has various problems. For example, since the searching method has a hierarchical menu tree structure, it is necessary to pass through an upper menu in order to move from a first lower level menu to another lower level menu of another category. Accordingly, when accessing a single item contained in a specific menu using the related art menu searching method, the user must navigate hierarchically configured menus, one by one.

In addition, if a menu is selected in error, the user must again perform the search step in the reverse order, or must start searching from the beginning after releasing the corresponding menu selection, in order to locate a desired menu.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide a mobile communication terminal and or method for searching a menu in a mobile communication terminal that substantially obviates problems caused by disadvantages in the related art.

It is another object of the present invention to provide mobile communication terminal and a method for searching a menu in a mobile communication terminal in which a main menu and a sub-menu can be simultaneously searched on a single menu screen.

It is another object of the present invention to provide a mobile communication terminal and a method for searching a menu in a mobile communication terminal that uses a two-dimensional menu navigation format.

It is another object of the present invention to provide a mobile communication terminal and a method for searching a menu in a mobile communication terminal in which horizontal menu movement is possible on a single menu screen.

It is still another object of the present invention to provide a mobile communication terminal and a method for searching a menu in a mobile communication terminal in which the number of menu accessing steps can be reduced by configuring all menu items in a planar structure.

To achieve at least the above objects in whole or in parts, there is provided a method for searching a menu in a mobile communication terminal, wherein a plurality of main menus and sub-menus of each main menu are simultaneously searched on a single menu screen by using up and down shift keys and left and right shift keys.

To further achieve at least the above objects, in whole or in parts, there is provided a method for searching a menu in a mobile communication terminal including the steps of displaying a menu screen by inputting a menu key; displaying a plurality of sub-menus on the same menu screen by selecting one of a plurality of main menus displayed on the menu screen; and selecting one of the plurality of sub-menus for thereby displaying a detailed list of the sub menu on a special window.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
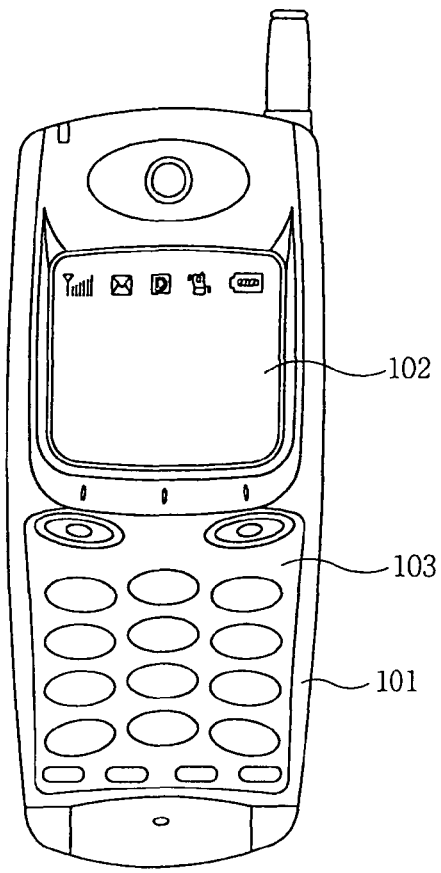
FIG. 1 is a schematic diagram illustrating an external structure of a related art mobile communication terminal.
Figure 2:
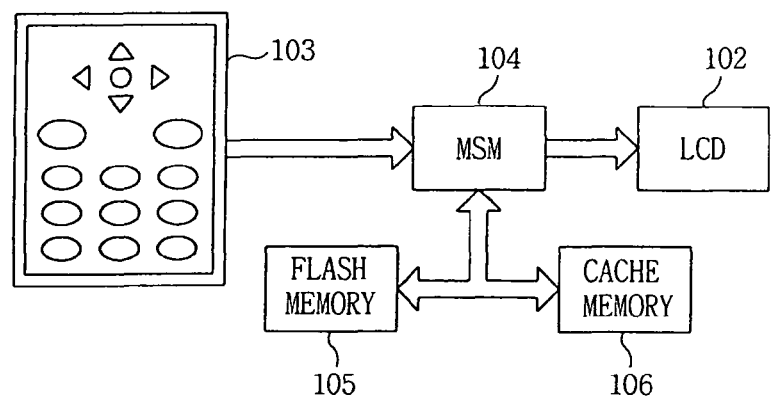
FIG. 2 is a schematic diagram illustrating an internal structure of a related art mobile communication terminal.
Figure 3A:
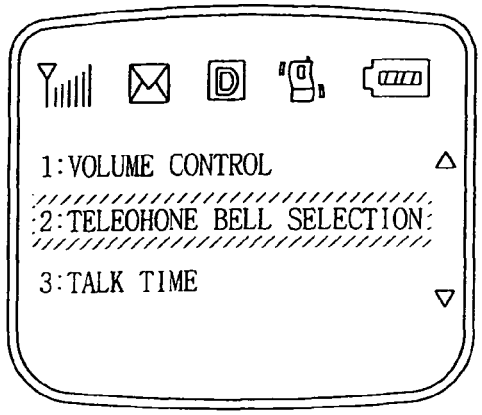
FIGS. 3A, 3B, and through 3C are drawings illustrating a related art method for searching a menu in a mobile communication terminal.
Figure 3B:
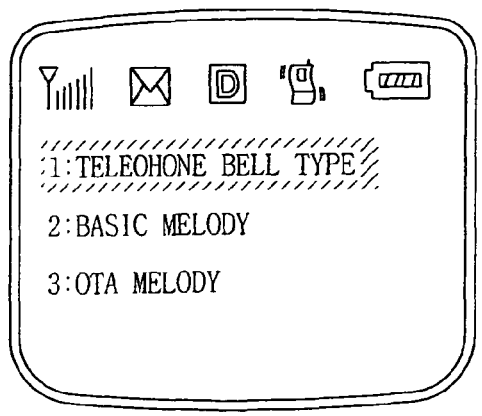
Figure 3C:
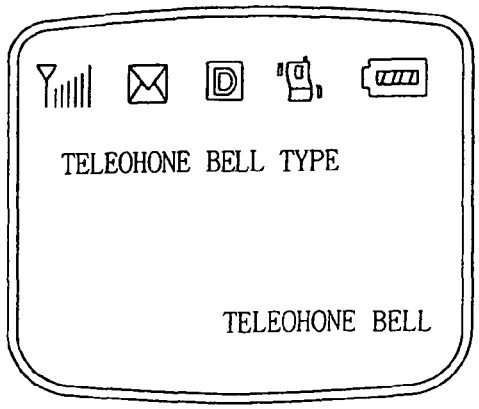
Figure 4:
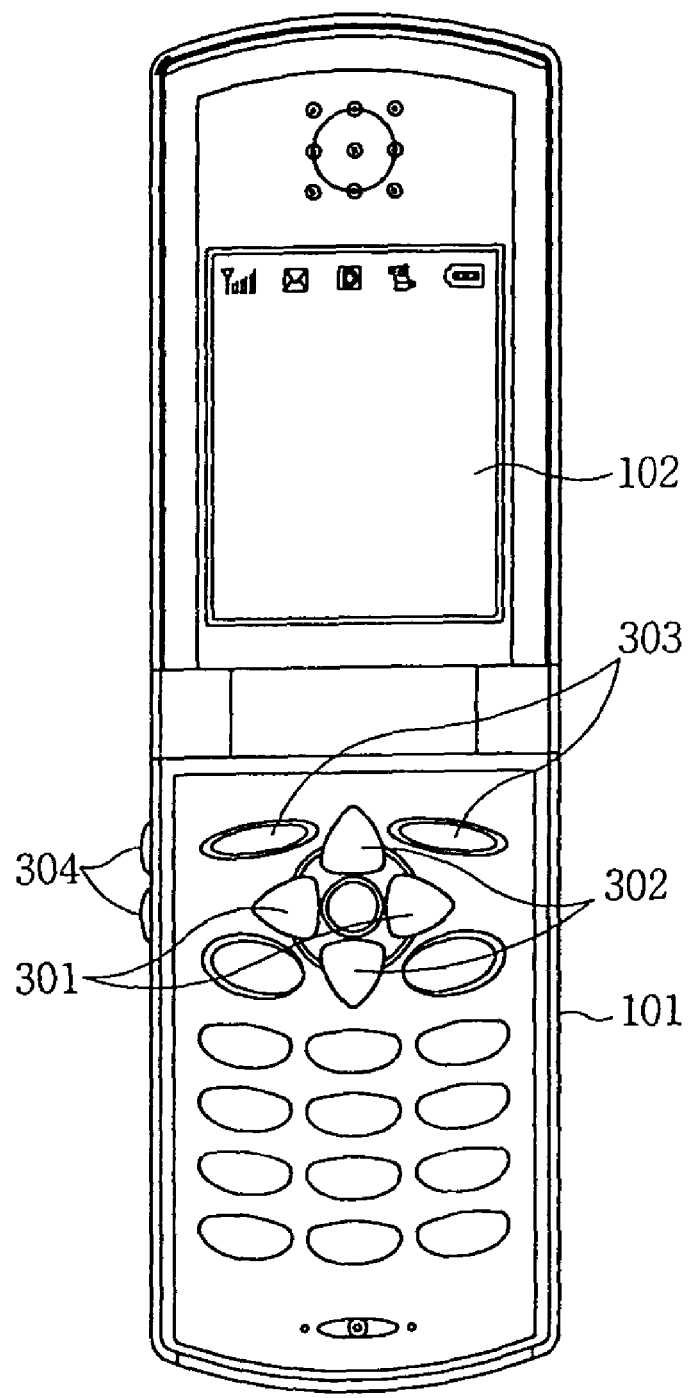
FIG. 4 is a schematic diagram illustrating the structure of a mobile communication terminal according to a preferred embodiment of the present invention.

FIG. 4 is a schematic diagram illustrating the structure of a mobile communication terminal according to the preferred embodiment of the present invention. Referring to FIG. 4, the mobile communication terminal preferably includes left and right shift keys 301 and up and down shift keys 302. Additionally, it preferably includes the keys described with reference to the related art mobile communication terminal, as shown in FIG. 1. In addition, the present invention preferably includes 20 available function keys, including two soft keys 303 and two side keys 304.

The left and right shift keys 301 are preferably used for movement between main menus, and the up and down shift keys 302 preferably used key for movement between sub menus and for selection of a detailed list. In addition, the left shift key can be used for deleting characters during an editing step.

The left soft key of the two soft keys 303 is preferably used to perform operations such as menu selection, Korean-English conversion, input, edit, cancel, and the like. It is also used for changing a flag (selecting a function) and increasing or decreasing a variable value on a program. The right soft key is used for performing operations such as menu check, store, complete, send, and the like. It is also used for changing a state and a sub state, or for returning to the previous state of a program. Finally, the side keys 304 are preferably used for controlling movement between sub menus (in a menu state), or controlling a key tone volume or a speech volume, according to the state of the terminal.

A method for searching a menu in the thusly constructed mobile communication terminal according to the preferred embodiment of the present invention will now be described with reference to the accompanying drawings.

The present invention is preferably configured in a two-dimensional menu navigation format. This makes it easier to understand the correlation of the sub-menu with an upper level menu. In other words, the present invention simultaneously displays a plurality of main menus, and sub-menus of each main menu, on a single menu screen.

In addition, the preferred embodiment is configured in such a manner that all menu items (sub menus and detailed lists thereof) contained in the conventional vertical menu tree structure are distributed in a planar structure in order to reduce the number of menu accessing steps.

In other words, when a user presses a menu key of a plurality of keys, a plurality of main menu icons are displayed on the menu screen of a LCD 102. In this state, the user selects a desired main menu by operating the left and right shift keys 301, and confirms the selection of the corresponding main menu by using the right soft key 303, upon such conformation, sub menus of the selected main menu are two-dimensionally displayed on the LCD 102.

Figure 5A:
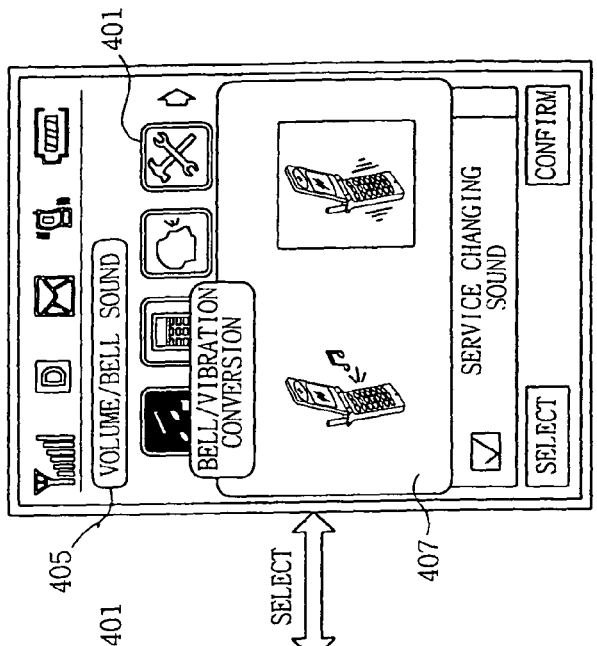
FIGS. 5 and 6 are views illustrating a method for searching a menu in a mobile communication terminal according to the preferred embodiment of the present invention.

At this time, at least three main and sub menu items are displayed on the menu screen. That is, as illustrated in FIG. 5A, the plurality of main menu icons 401 are displayed in a horizontal direction of the menu screen, and a plurality of sub menus 406 corresponding to each main menu are displayed in a vertical direction of the menu screen.

In addition, the plurality of sub menus 406 are displayed on a specially set sub menu list window 402. The thusly displayed sub menus 406 are divided into application type icons 403 for displaying a detailed list on a new window and list type icons 404 for only indicating "set/release".

For instance, when the user selects the main menu icon 401 corresponding to "volume/bell sound" in the main menus displayed on the menu screen, the sub menu list window 402 displays sub menus, such as "bell/vibration conversion," "bell/melody conversion," "bell loudness," "call connecting sound," "service changing sound," for example. The selected main menu icon is then displayed in such a way as to indicate selection, for example by being shaded. In the preferred embodiment, the name of the selected main menu is also displayed at the upper end of the main menu icon.

In this state, if the user moves to other main menus by operating the left and right shift keys 301, sub menus of the moved menu screen are displayed on the sub menu list window 402.

Once the sub menus are displayed on the sub menu list window 402, the user can select one of the plurality of sub menus by operating the up and down shift keys 302. If the user selects one of the application type icons, for example, "bell/vibration conversion," "bell/melody conversion," and "bell loudness," the detailed list of the selected sub menu is displayed on a new window. That is, in the preferred embodiment, the state of the menu is distinguished from the state of the list by opening a new window for the selected item.

Figure 5B:
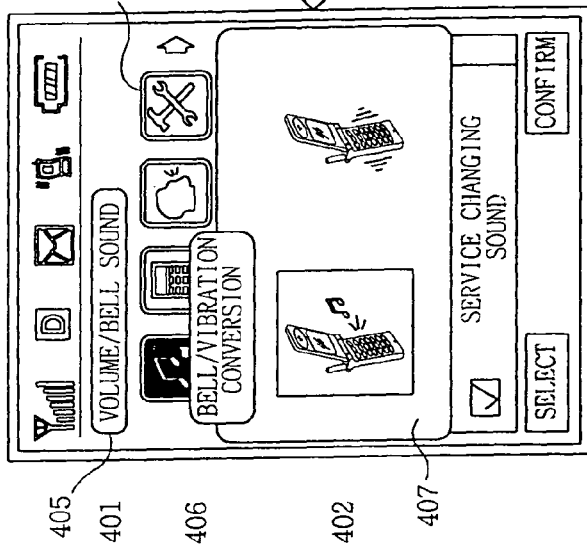
Figure 5C:
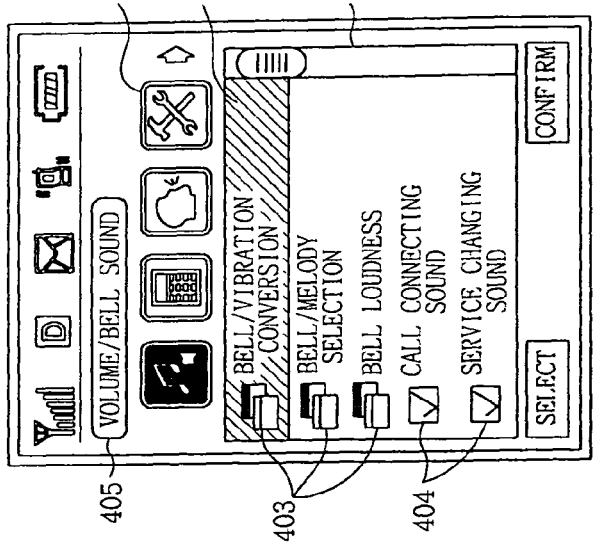

For instance, if the "bell/vibration conversion" is selected from the sub menus, the LCD 102 displays a new window 407. The new said window 407 preferably displays a detailed list, including the options to set the "bell" or "vibration" mode. Thus, the user selects a desired function, e.g., bell/vibration conversion, by selecting/confirming one item from the list displayed on the window 407 using the left and right soft keys 303, as illustrated in FIGS. 5B and 5C.

Since the sub menus, such as the "call connecting sound" and "service changing sound," are displayed as list type icons capable of only selecting "set/release", the user can select/confirm or release the corresponding sub menu on the sub menu list using the left and right soft keys 303.

Figure 6C:
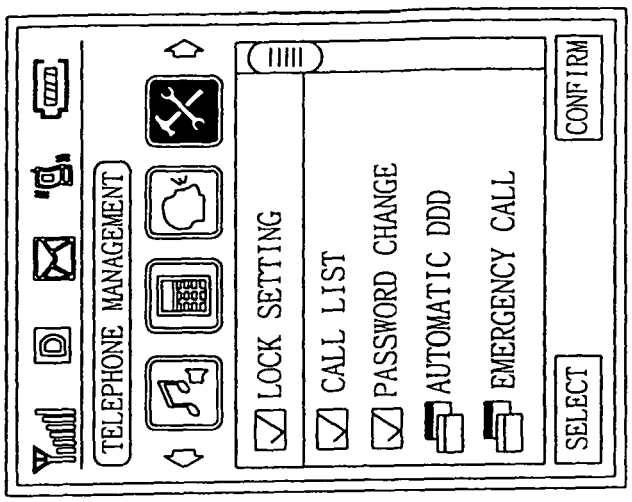
Figure 6B:
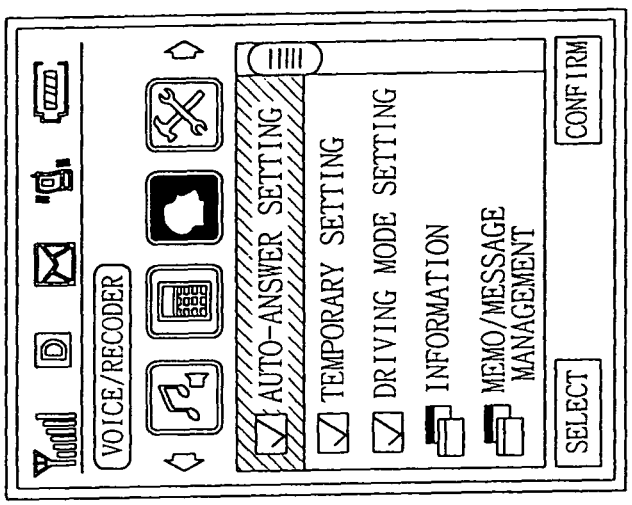
Figure 6A:
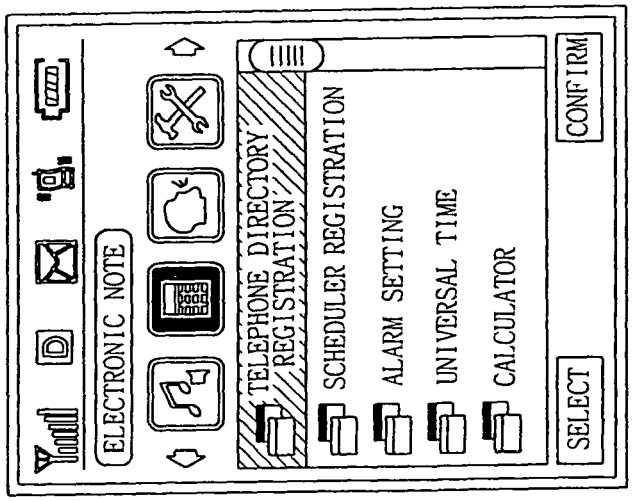

As illustrated in FIG. 6A, if the user moves to another main menu (for example, "electronic note") using the left and right shift keys 301, the icon of the "electronic note" is shaded and the name of the selected main menu is displayed on the upper end of the main menu icon, as described above. In other words, in the preferred embodiment, it is possible to search other main menus while searching a sub menu or a detailed list thereof.

As illustrated in FIG. 6A, the sub menu list window 402 displays a detailed list of items, such as "telephone directory registration," "scheduler registration," "alarm setting," "universal time," "calculator," and the like. Additionally, the user can select a desired sub menu on the displayed detailed list by operating the up and down shift keys. Hence, the detailed list for the selected sub menu is displayed on a new window.

By using the same method, as illustrated in FIGS. 6B and 6C, the user can search any other main menu, such as "voice recorder," "telephone management" and the like. In addition, the preferred embodiment configures the searching step of sub menus subject to each main menu in the same manner, so that the user is not confused when searching/selecting a menu.

Main menus are preferably arranged in a horizontal direction of the menu screen, and sub menus are preferably arranged in a vertical direction of the screen, for convenience of explanation. However, any configuration could be used. For example, the main menus could be arranged in the vertical direction of the menu screen, and the sub menus could be arranged in the horizontal direction of the menu screen.

The present invention has many advantages. For example, in the preferred embodiment, it is possible to configure a very simple menu searching step by configuring a two-dimensional menu navigation format, without having to use a hierarchical menu tree structure.

In addition, it is easier to search a desired menu since the correlation with an upper level menu can be easily understood on a single screen. Hence, more than just a list of the menu that the user searches for can be viewed.

Moreover, it is possible to reduce the inconvenience caused by movement in the searching step by making a configuration in such a manner that a horizontal menu movement is made possible. That is, it is not necessary to pass through an upper level menu upon moving from a lower level menu to another lower level menu of other categories (main menu).

In addition, the number of menu accessing steps is reduced by widely distributing all menu items in a planar structure allowing the user to directly select a desired menu item. This makes it easier and quicker to access the desired item.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method comprising:
   displaying at least one item from a first menu in a first area of a display screen of a mobile communication terminal simultaneously with displaying a second menu in a second area of the display screen, the second menu including a plurality of items listed vertically that are divided into application type icons for displaying a detailed list on a new window and list type icons for indicating set or release, the display screen including a status information area, and the second area of the display screen is a defined window region that is distinguished from the first area of the display screen; and
   highlighting a region around a selected second menu item in response to selecting one of the displayed second menu items,
   wherein the defined window region of the second area is provided in a shape of a window that displays an application type icon and a list type icon and includes a plurality of sub regions for allocating the plurality of second menu items and a scroll bar for scrolling the allocated plurality of second menu items, and
   wherein the sub region of the selected second menu item is highlighted to distinguish the selected second menu item from non-selected second menu items.

2. The method of claim 1, further comprising selecting one item from the displayed second menu using a side key.

3. The method of claim 1, further comprising displaying information regarding a set feature of one of the displayed second menu items.

4. The method of claim 1, wherein the first menu and the second menu are hierarchically structured, and the first menu is higher than the second menu in the hierarchical structure.

5. The method of claim 1, further comprising:
   selecting the one of the second menu items; and
   displaying a new window on the display screen related to information of the selected one of the second menu items while displaying at least one item from the first menu in the first area of the display screen.

6. The method of claim 5, wherein displaying the new window includes displaying the detailed list corresponding to the selected one of the second menu items.

7. The method of claim 5, wherein selecting the one of the second menu items includes selecting the one of the second menu items using a key.

8. The method of claim 1, wherein the first menu comprises a plurality of icons and the second menu comprises a plurality of icons.

9. The method of claim 1, further comprising displaying the at least one item from the first menu in a manner that is different than color of other items from the first menu.

10. The method of claim 1, wherein displaying the at least one item comprises displaying a plurality of items of the first menu in a horizontal direction.

11. The method of claim 10, further comprising displaying a name on the display screen simultaneously with displaying the plurality of items of the first menu.

12. The method of claim 11, wherein the name is displayed above the plurality of items of the first menu such that the plurality of items of the first menu are displayed between the name and the displayed second menu.

13. The method of claim 1, further comprising displaying an indicator in the first area of the display screen to identify existence of a non-displayed first menu item.

14. The method of claim 13, wherein the indicator comprises an arrow.

15. The method of claim 1, further comprising displaying a name corresponding to the at least one item from the first menu.

16. A mobile communication terminal comprising:
   a display screen that includes a status information area, a first area for displaying menu information and a second area for displaying menu information, and the second area of the display screen is a defined window region that is distinguished from the first area of the display screen; and
   a controller configured to display at least one item from a first menu in the first area of a display screen of a mobile communication terminal simultaneously with displaying a second menu in the second area of the display screen, the second menu including a plurality of items listed vertically that are divided into application type icons for displaying a detailed list on a new window and list type icons for indicating set or release, and the controller is configured to display a sub region around a first one of the displayed second menu items to distinguish the first one of the displayed second menu items from a second one of the displayed second menu items, wherein the defined window region of the second area is provided in a shape of a window that displays an application type icon and a list type icon and includes a plurality of sub regions for allocating the plurality of second menu items and a scroll bar for scrolling the allocated plurality of second menu items, and wherein when a specific second menu item is selected, the sub region of the selected second menu item is highlighted.

17. The terminal of claim 16, wherein the display screen displays the scroll bar in the second area of the display screen.

18. The terminal of claim 16, wherein the display screen displays information regarding a set feature of one of the displayed second menu items.

19. The terminal of claim 16, wherein one of the keys is used to select one of the items of the second menu, and the display screen displays a new window on the display screen related to information of the selected one of the items of the second menu while simultaneously displaying at least one item from the first menu in the first area of the display screen.

20. The terminal of claim 19, wherein the display screen displays the new window including the detailed list corresponding to the selected one of the items of the second menu.

21. The terminal of claim 16, wherein the display screen displays the at least one item from the first menu in a manner that is different than color of other items from the first menu.

22. The terminal of claim 16, wherein the display screen displays a plurality of items of the first menu in a horizontal direction.

23. The terminal of claim 22, wherein the display screen displays a name on the display screen simultaneously with the display of the plurality of items of the first menu.

24. The terminal of claim 16, wherein the display screen displays an indicator in the first area of the display screen to identify existence of a non-displayed first menu item.

25. A mobile communication terminal comprising:
a display unit configured to display a display screen, the display screen including a status information area, a first area for displaying menu information and a second area for displaying menu information, and the second area of the display screen is a defined window region that is distinguished from the first area of the display screen; and a controller configured to display at least one item from a first menu in the first area of the display screen of a mobile communication terminal simultaneously with displaying a second menu in the second area of the display screen, wherein the first area includes a plurality of the first menu items and an indicator positioned at least one side of the first menu items to horizontally display the first menu items, wherein the defined window region of the second area is provided in a shape of a window that displays an application type icon and a list type icon and includes a plurality of sub regions to allocate the plurality of second menu items and a scroll bar to vertically display the allocated plurality of second menu items, and wherein when one of the second menu items is selected, the sub region of the selected second menu item is shaded to distinguish the selected second menu item from non-selected second menu items.

26. The terminal of claim 25, wherein the controller displays a new window on the display screen containing a detailed list corresponding to the selected one of the second menu items, while simultaneously displaying at least one of the first menu items in the first area of the display screen.

27. The terminal of claim 25, wherein the indicator is displayed in the first area of the display screen at one side or both sides of the plurality of the first menu items.

28. The terminal of claim 25, wherein the indicator displayed in the first area of the display screen identifies existence of a non-displayed first menu item.

* * * * *